US008857712B2

(12) United States Patent
Hoskinson et al.

(10) Patent No.: US 8,857,712 B2
(45) Date of Patent: Oct. 14, 2014

(54) MODULAR SCANNER COMPONENT MOUNTING SYSTEM FOR CHECKSTAND (75) Inventors: Jeffrey J. Hoskinson, Eugene, OR (US); Paul R. Huss, Eugene, OR (US); Stepan Ryabinin, Portland, OR (US); Michael P. Svetal, Eugene, OR (US); Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 13/454,377

(22) Filed: Apr. 24, 2012

(65) Prior Publication Data
US 2012/0205448 A1 Aug. 16, 2012

Related U.S. Application Data (63) Continuation of application No. PCT/US2012/022328, filed on Jan. 24, 2012, which is a continuation of application No. 13/356,504, filed on Jan. 23, 2012, now abandoned.

(60) Provisional application No. 61/435,684, filed on Jan. 24, 2011.

(51) Int. Cl.
G06K 15/00 (2006.01)
G06K 7/10 (2006.01)

(52) U.S. Cl.
CPC ................ G06K 7/10445 (2013.01)
USPC ............ 235/383; 235/462.32; 235/462.01; 235/462.14

(58) Field of Classification Search
USPC ........... 235/439, 440, 483, 462.22, 462.32, 235/462.43, 462.01, 462.14
See application file for complete search history.

(56) References Cited

U.S. PATENT DOCUMENTS 4,020,924 A * 5/1977 Conrotto et al. ............ 186/61
4,789,048 A * 12/1988 Cramer et al. ............. 186/61
(Continued)

FOREIGN PATENT DOCUMENTS

| EP | 1020810 B1 | 6/2004 |
| JP | 11-203423 | 7/1999 |
| JP | 2002-029608 | 1/2002 |

OTHER PUBLICATIONS

Korean Intellectual Property Office, International Search Report and Written Opinion, International Patent Application No. PCT/US2012/022328, dated Jul. 30, 2012, 14 pages.

(Continued)

Primary Examiner — Paultep Savusdiphol
(74) Attorney, Agent, or Firm — Stoel Rives LLP (57) ABSTRACT An arrangement for a tunnel scanner includes a chassis with a first data reader structure and a second data reader structure attached thereto. The first and second data reader structures include data readers that are pre-positioned before the first and second data reader structures are attached to the chassis. Indexing features of the first and second data reader structures cooperate with corresponding indexing features of the chassis to properly position the data readers relative to the chassis. In one assembly method, one or more data reader structures having pre-positioned data readers are shipped to an assembly location for a tunnel data reader. A chassis is either provided at or shipped to the assembly location. In one configuration, the data reader structures are indexed and attached to the chassis such that each data reader is placed at a desired location and orientation with respect to the chassis.

16 Claims, 9 Drawing Sheets

(56) References Cited

U.S. PATENT DOCUMENTS

| | | | |
|---|---|---|---|
| 4,939,355 A | | 7/1990 | Rando et al. |
| 4,955,693 A | | 9/1990 | Bobba |
| 5,211,263 A | | 5/1993 | Davidson et al. |
| 5,422,471 A | * | 6/1995 | Plesko .................... 235/462.36 |
| 5,491,328 A | | 2/1996 | Rando |
| RE35,243 E | | 5/1996 | Tolson |
| 5,537,292 A | | 7/1996 | Bowen |
| 5,668,362 A | * | 9/1997 | Plesko .................... 235/462.36 |
| 5,723,824 A | | 3/1998 | Stadler |
| 5,837,988 A | | 11/1998 | Bobba et al. |
| 5,869,827 A | | 2/1999 | Rando |
| 6,142,376 A | * | 11/2000 | Cherry et al. ............ 235/462.14 |
| 6,257,490 B1 | | 7/2001 | Tafoya |
| 6,498,603 B1 | * | 12/2002 | Wallace ....................... 345/177 |
| 6,588,665 B2 | * | 7/2003 | Knowles et al. ......... 235/462.01 |
| 6,619,473 B2 | | 9/2003 | Romeo |
| 6,845,706 B2 | * | 1/2005 | Kim et al. ....................... 99/348 |
| 6,961,456 B2 | | 11/2005 | Bonner et al. |
| 7,173,235 B2 | | 2/2007 | Ito |
| 7,389,867 B2 | * | 6/2008 | Hillmantel et al. ........... 198/395 |
| 7,648,020 B2 | | 1/2010 | Dickover et al. |
| 7,757,955 B2 | | 7/2010 | Barkan |
| 7,780,086 B2 | | 8/2010 | Barkan et al. |
| 2003/0141367 A1 | * | 7/2003 | Lucera et al. .............. 235/462.4 |
| 2003/0196557 A1 | * | 10/2003 | Kim et al. ....................... 99/348 |
| 2005/0103852 A1 | * | 5/2005 | Lucera et al. ............ 235/462.14 |
| 2007/0131770 A1 | | 6/2007 | Nunnink |
| 2007/0297021 A1 | | 12/2007 | Smith |
| 2008/0011846 A1 | * | 1/2008 | Cato ............................. 235/435 |
| 2008/0121689 A1 | * | 5/2008 | Good et al. .................... 235/375 |
| 2009/0020612 A1 | | 1/2009 | Drzymala et al. |
| 2009/0084854 A1 | | 4/2009 | Carlson et al. |
| 2009/0134221 A1 | * | 5/2009 | Zhu et al. ...................... 235/383 |
| 2010/0006518 A1 | * | 1/2010 | Brobst ............................ 211/26 |
| 2010/0163627 A1 | | 7/2010 | Olmstead |

OTHER PUBLICATIONS

Advantage Checkout, Behold, I Have Seen the Future . . . , http://www.cincysavers.com/blog/tag/advantage-checkout/, Apr. 9, 2010, visited Jan. 5, 2011, 2 pgs.

\* cited by examiner

MODULAR SCANNER COMPONENT MOUNTING SYSTEM FOR CHECKSTAND

RELATED APPLICATIONS

This application is a continuation of and claims the benefit under 35 U.S.C. §§365(c) and 120 from International Application No. PCT/US2012/22328, filed Jan. 24, 2012, which claims priority to U.S. patent application Ser. No. 13/356,504, filed Jan. 23, 2012, and to U.S. Provisional Patent Application No. 61/435,684, filed Jan. 24, 2011, all of which are incorporated herein by reference.

BACKGROUND

The field of this disclosure generally relates to tunnel scanner structures and accompanying mounting systems and methods of assembling such structures and mounting systems.

A tunnel scanner is a system including a structure that typically holds two or more data readers in a manner such that the data readers can view and capture multiple sides of an object as the object passes through the tunnel scanner. One type of tunnel scanner may include data readers arranged at a top position, two side positions, and a bottom position to view multiple sides of an object. Conveyor belts are commonly used to move items through the structure. Currently available tunnel scanners tend to be relatively large and bulky, box-like structures that have a tunnel portion similar to a scale model of a railway or automotive tunnel. One example is the tunnel scanners commonly used at airports to scan luggage.

The present inventors have recognized certain disadvantages associated with current tunnel scanners. For example, one disadvantage is that the current tunnel scanners require multiple data readers attached on numerous sections of the structure. However, it is difficult and time-consuming to position and arrange the data readers on multiple sections of the structure so as to prevent interference with one another and provide each data reader with a clear view of an object. Moreover, such an approach commonly requires data readers to be individually adjusted or tuned after all of the data readers have been installed on the structure and the components of the structure have been secured together.

Another disadvantage the present inventors have recognized is that current tunnel scanners tend to be large, heavy, and bulky, thereby making them difficult and expensive to transport. Yet, another disadvantage the present inventors have recognized with current tunnel scanners is that when a data reader fails, malfunctions, or otherwise needs to be replaced, such replacement is relatively difficult and time consuming, as it may involve: disassembling portions of the structure, removing the old data reader, installing the new data reader, adjusting or tuning the new data reader, verifying whether other data readers need to be readjusted or tuned, and reassembling the structure.

Another disadvantage the present inventors have recognized with current tunnel scanners is that they tend to be relatively wide, in comparison with the size of a conveyor belt because additional structure (apart from the structure used to hold the data readers) is typically required to support the conveyors. In many tunnel scanner designs, such additional structure is often placed on opposing lateral sides of the conveyor belt.

SUMMARY

The present disclosure is directed at tunnel scanner structures and mounting systems and methods for assembling such tunnel scanner structures and systems.

In some preferred embodiments, separate data reader structures are attached to a reference structure to orient various data readers with respect to one another. In another preferred system/method, one or more data reader structures are moveably attached to a reference structure such that the data readers move between a cleaning/servicing position and an operating position.

In one example assembly method, one or more data reader structures are received at a location where a tunnel data reader is to be assembled, with each data reader structure containing one or more pre-positioned data readers. A chassis or a mounting platform is either provided at the location or is shipped to the location. The data reader structures may then be indexed to and attached to the chassis such that each data reader is placed at a desired location and orientation with respect to the chassis.

Additional aspects and advantages will be apparent from the following detailed description of preferred embodiments, which proceeds with reference to the accompanying drawings.

DETAILED DESCRIPTION OF PREFERRED EMBODIMENTS

The described features, structures, characteristics, and methods may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or operations are not shown or not described in detail to avoid obscuring aspects of the embodiments. For convenience, the methods and systems may be described herein with reference to optical code reading, however, it is understood that the systems and methods described herein are applicable to a variety of host computers, data readers, including optical code readers (e.g., imaging readers and flying spot laser scanners, and RFID readers.

Features or advantages exhibited by described, or other, embodiments include one or more of decreasing shipping costs, decreasing costs and time associated with replacing parts damaged during shipping or during usage, and decreasing reliance on the structure, configuration and tolerance of counter components to accurately place multiple data readers in desired locations and angular orientations with respect to one another.

Figure 1:
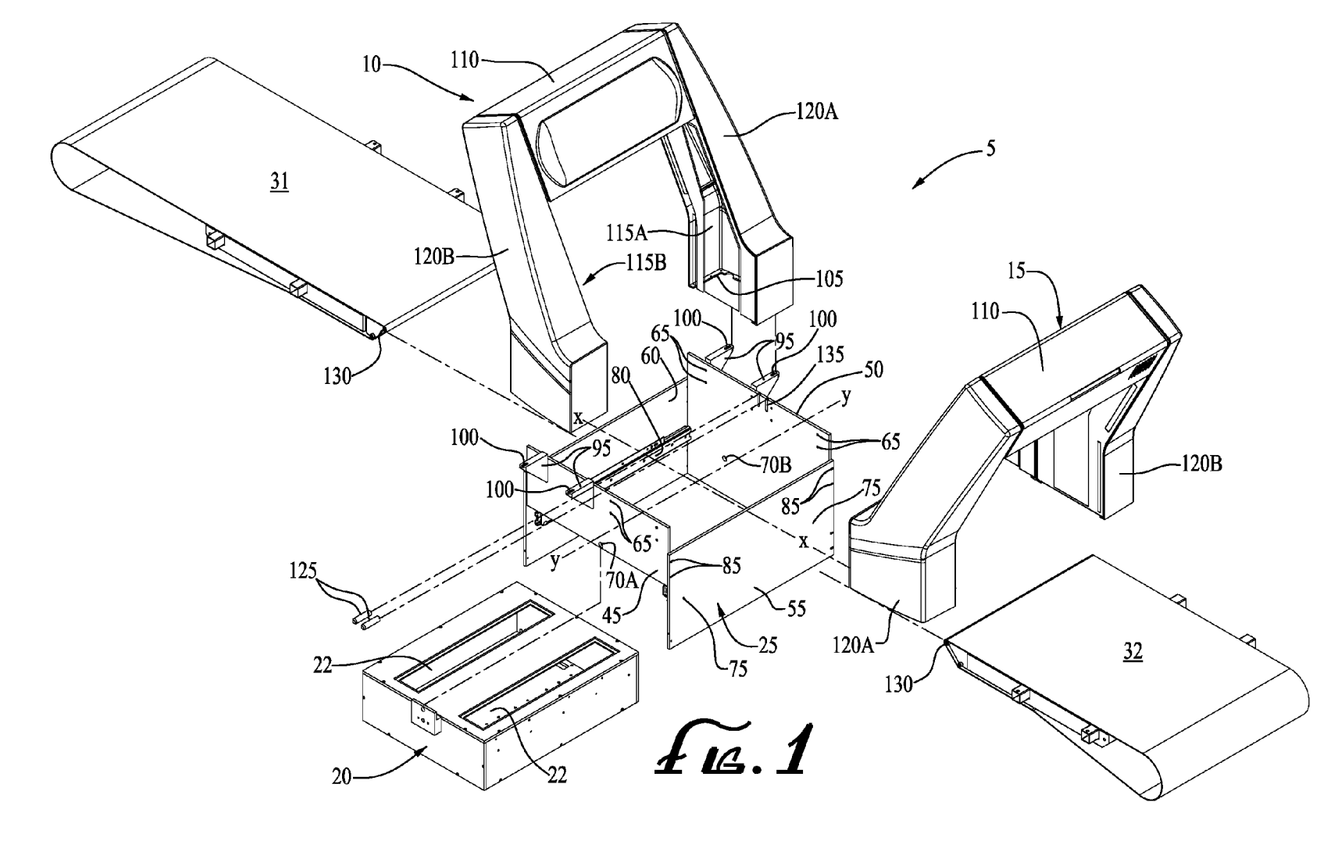
FIG. 1 is a front top, exploded isometric view of a tunnel scanner, according to one embodiment.

FIG. 1 illustrates one example embodiment of a tunnel data reader arrangement 5 that includes three separate components, a first arch 10, a second arch 15, and a bottom data reader mount 20. These three components are preferably designed and constructed to be shipped separately to a location where the tunnel data reader arrangement 5 is to be assembled or installed. One such exemplary location is to a system integrator who integrates the tunnel data reader arrangement 5 into a structure bearing conveyor belts, or to a store with a check-out counter configured to bear the tunnel data reader arrangement 5 and conveyor belts (see FIG. 2). Other numbers of separate components, such as one, two, or more data reader structures may be used. In another embodiment, a chassis or mounting platform 25 may also be shipped with the first arch 10, the second arch 15, and the bottom data reader mount 20. Alternatively, the chassis 25 can be built at, or otherwise supplied to, the location where the tunnel data reader arrangement 5 is to be assembled or installed.

Although the embodiment in FIG. 1 illustrates an open space between the first and second arches 10, 15, the first and second arches 10, 15 may be embodied in an elongated tunnel formed over or around the conveyors 31, 32. The tunnel data reader arrangement 5 may thus be partially open and partially enclosed, such as the example illustrated in FIG. 1, or fully enclosed such as via a tunnel enclosure. The configuration of the first and second arches 10, 15 creates an open architecture that provides some barrier/inhibition from a customer reaching into the read zone, while also providing sight lines for allowing the customer to generally continuously observe items passing through the arches 10, 15. A tunnel scanner need not include any tunnel or even semi-enclosed arches, but a suitable tunnel scanner may be constructed with more or less openness between the arches 10, 15.

One advantage of having separate components is that shipping the tunnel data reader arrangement 5 is easier, and often less expensive, since each separate component can be shipped in a much smaller shipping container than if the components were to be shipped as a single unit. In addition, if a component is damaged during shipping or use, only that damaged component needs to be shipped back for repair or replacement, not the entire tunnel data reader arrangement 5.

Another advantage to having separate components is that if the tunnel data reader arrangement 5 malfunctions due to inoperability of an individual data reader, that data reader may be replaced individually without requiring disassembly of the entire tunnel data reader arrangement 5. Moreover, replacing the damaged data reader structure is a fast and easy way to repair the tunnel data reader arrangement 5 with a high confidence that the new data reader(s) in the new data reader structure are properly located and oriented with respect to the other data reader(s) (as explained more fully below).

A preferred method for assembling the tunnel data reader arrangement 5 includes receiving the first arch 10, the second arch 15, and the bottom data reader mount 20 at an assembly location where the tunnel data reader arrangement 5 is to be assembled. Each of the first arch 10, the second arch 15, and the bottom data reader mount 20 includes one or more pre-positioned data readers as described below with reference to FIGS. 1 and 2. The tunnel data reader arrangement 5 is formed by attaching the first arch 10 to a chassis 25 (which may either be built at the assembly location or shipped to the assembly location) such that a data reader contained in the first arch 10 is located at a first location and angular orientation with respect to the chassis 25 and by attaching the second arch 15 to the chassis 25 such that a data reader contained in the second arch 15 is located at a second location and angular orientation with respect to the chassis 25. In a preferred arrangement, the first arch 10 and the chassis 25 each include mating indexing features to provide or allow for precise alignment of the first arch 10 with the chassis 20. Likewise, the second arch 15 and the chassis 25 each include mating indexing features to precisely align the second arch 15 with the chassis 25. Such indexing features may include, but are not limited to, pins and corresponding mating features, such as apertures, holes, magnets, and/or tongues and grooves.

In another arrangement, both the first arch 10 and the second arch 15 include unique keying features, such as a uniquely shaped post or a series of posts placed in a unique arrangement, that mate with a matching unique keying feature of the chassis 25 such as a uniquely shaped aperture or a series of apertures placed in a unique arrangement to ensure that the first arch 10 and the second arch 15 are each placed in the correct location and are oriented correctly with respect to the chassis 25. For example, while the first arch 10 and the second arch 15 may have the same size and appearance, different wiring or electronics could be contained in either of the first arch 10 or the second arch 15, thus making the first arch 10 and the second arch 15 not interchangeable with regard to their respective positions on the chassis 25. In other examples, the first arch 10 and the second arch 15 may be identical and thus the first arch 10 and the second arch 15 are interchangeable on the chassis 25 and unique keying features may not be needed. One advantage to having an identical first arch 10 and second arch 15 is that a supplier, operator or owner of the tunnel data reader arrangement 5 may simply keep relatively few arches in inventory as replacement components.

Figures 1A, 2:
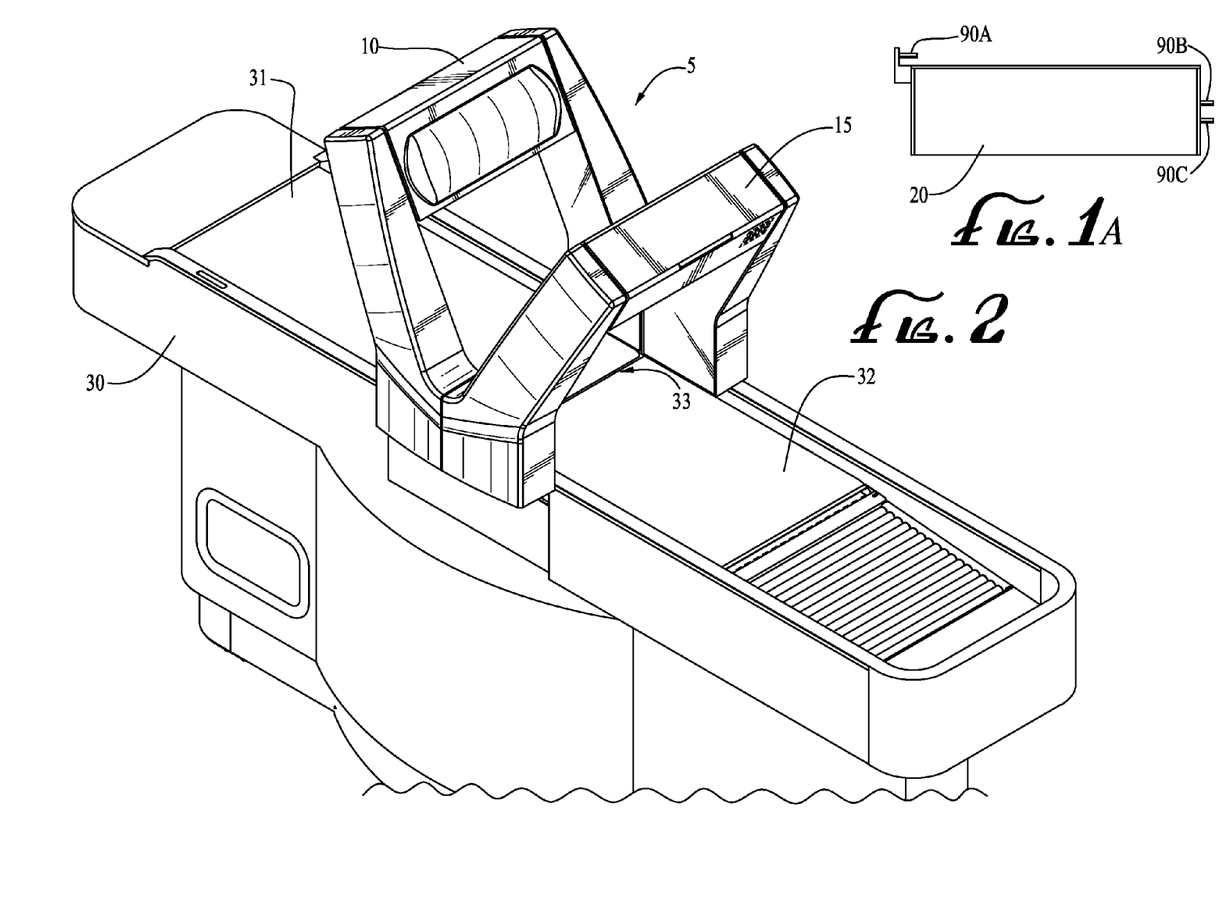
FIG. 1A is a right side plan view of a bottom data reader mount of the tunnel scanner of FIG. 1.
FIG. 2 is a front top, isometric view of the tunnel scanner of FIG. 1 installed in a checkout counter.
Figure 6:
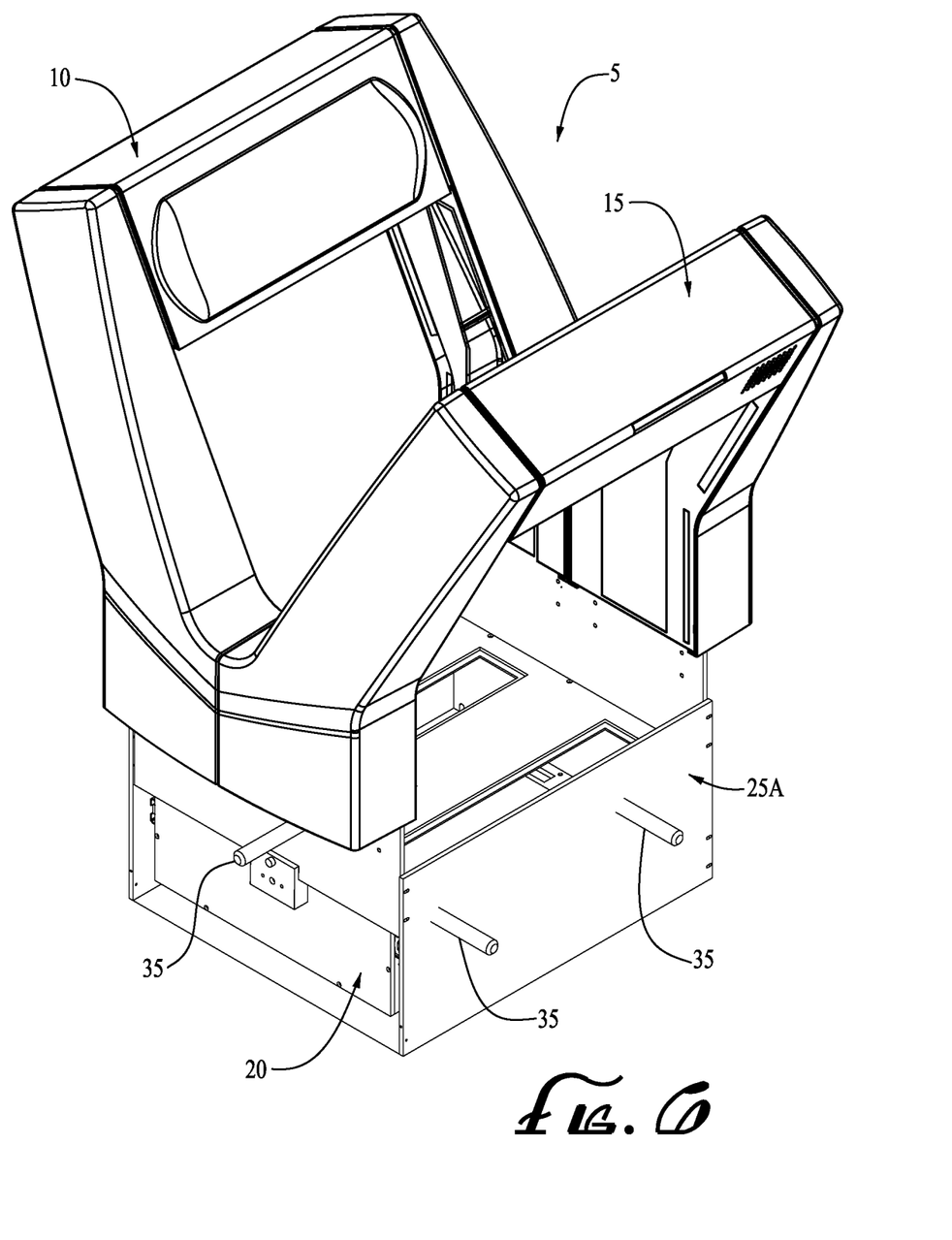
FIG. 6 is a front top, isometric view of another embodiment of a tunnel scanner.
Figure 7:
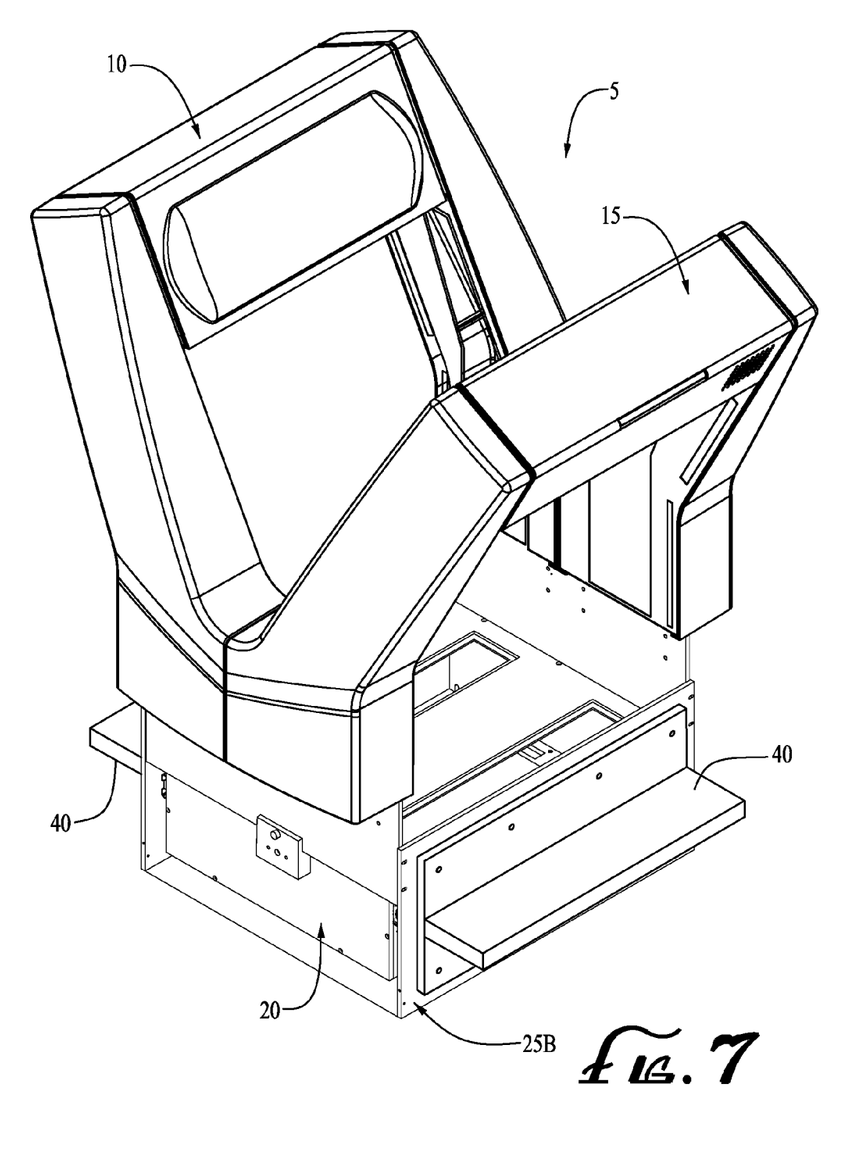
FIG. 7 is a front top, isometric view of yet another embodiment of a tunnel scanner.
Figure 8:
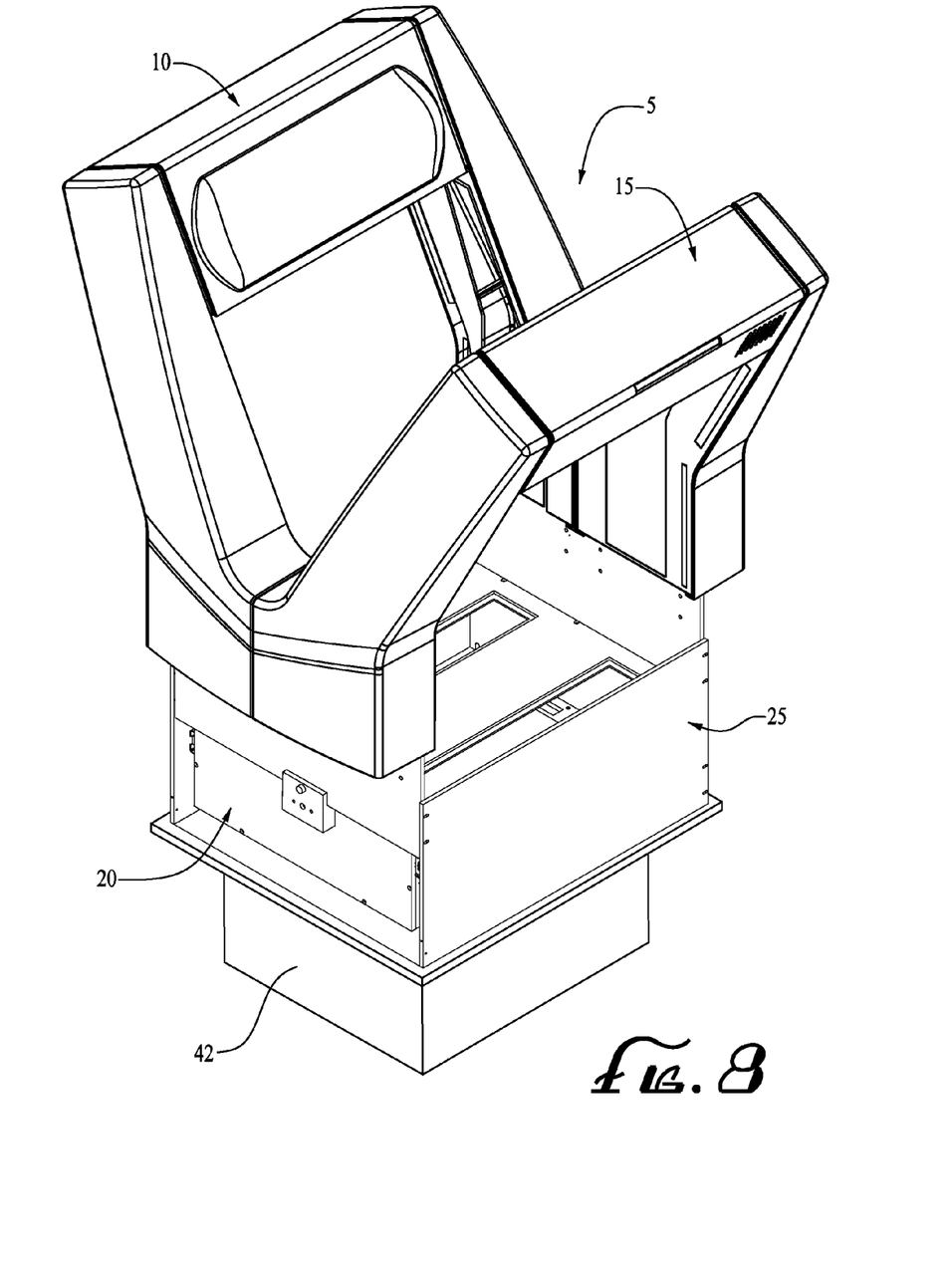
FIG. 8 is a front top, isometric view of the tunnel scanner of FIG. 1 mounted on a support.

The assembled tunnel data reader arrangement 5 is inserted into a structure, such as a counter 30, configured to bear two conveyor belts 31, 32 (FIG. 2). Preferably, the alignment and orientation of the data readers retained by the tunnel data reader arrangement 5 are independent of the configuration and tolerances of the counter structure 30 as described below with reference to FIGS. 1 and 2. In other arrangements, a mounting component, such as alignment features 35 (FIG. 6), a flange 40 (FIG. 7), or a support 42 (FIG. 8), may be attached to the chassis 25 and used to facilitate inserting the tunnel data reader arrangement 5 into a counter structure 30.

In some embodiments, the tunnel data reader arrangement 5 may be hard mounted to the structure 30, that is, secured to the structure 30 using fasteners such as screws, clips, pins, or other suitable fasteners. In other embodiments, the tunnel data reader arrangement 5 may be float mounted to the structure 30, that is, resting on a component such that the tunnel data reader arrangement 5 is moveable with respect to the structure 30. Vibration dampeners may be included between the tunnel data reader arrangement 5 and the counter structure 30, or the mounting component may include vibration dampeners, such that vibrations from conveyor belts 31, 32 reaching the tunnel data reader arrangement 5 are reduced or eliminated.

In some embodiments, the various data readers retained in the first arch 10, the second arch 15, and the bottom data reader mount 20 may be pre-positioned, or tuned, so as not to interfere with one another when the first arch 10, the second arch 15, and the bottom data reader mount 20 are manufactured. Such pre-positioning during the manufacturing process accounts for the condition when the first arch 10, the second arch 15, and the bottom data reader mount 20 are attached to the chassis 25. For example, the various fields of view for optical data readers are preferably arranged to provide overlapping coverage of an object passing through the tunnel data reader arrangement 5 without interfering with each other. In addition, the lights illuminating such an object are located so as to provide sufficient illumination for capturing an image of the object but not to shine directly into any of the data readers, which would saturate the image.

The configuration and tolerances of the first arch 10, the second arch 15, the bottom data reader mount 20, and the chassis 25, combined with one or more indexing features, such as precisely located apertures and matching threaded apertures for receiving machine screws, pins and mating holes, tongues and mating grooves, magnets, or other suitable indexing feature, operate to provide precise positioning of the data reader structures and the various data readers. Thus, after securing the first arch 10, the second arch 15, and the bottom data reader mount 20 to the chassis 25, further adjustment or tuning of individual data readers may not be necessary.

Figure 9:
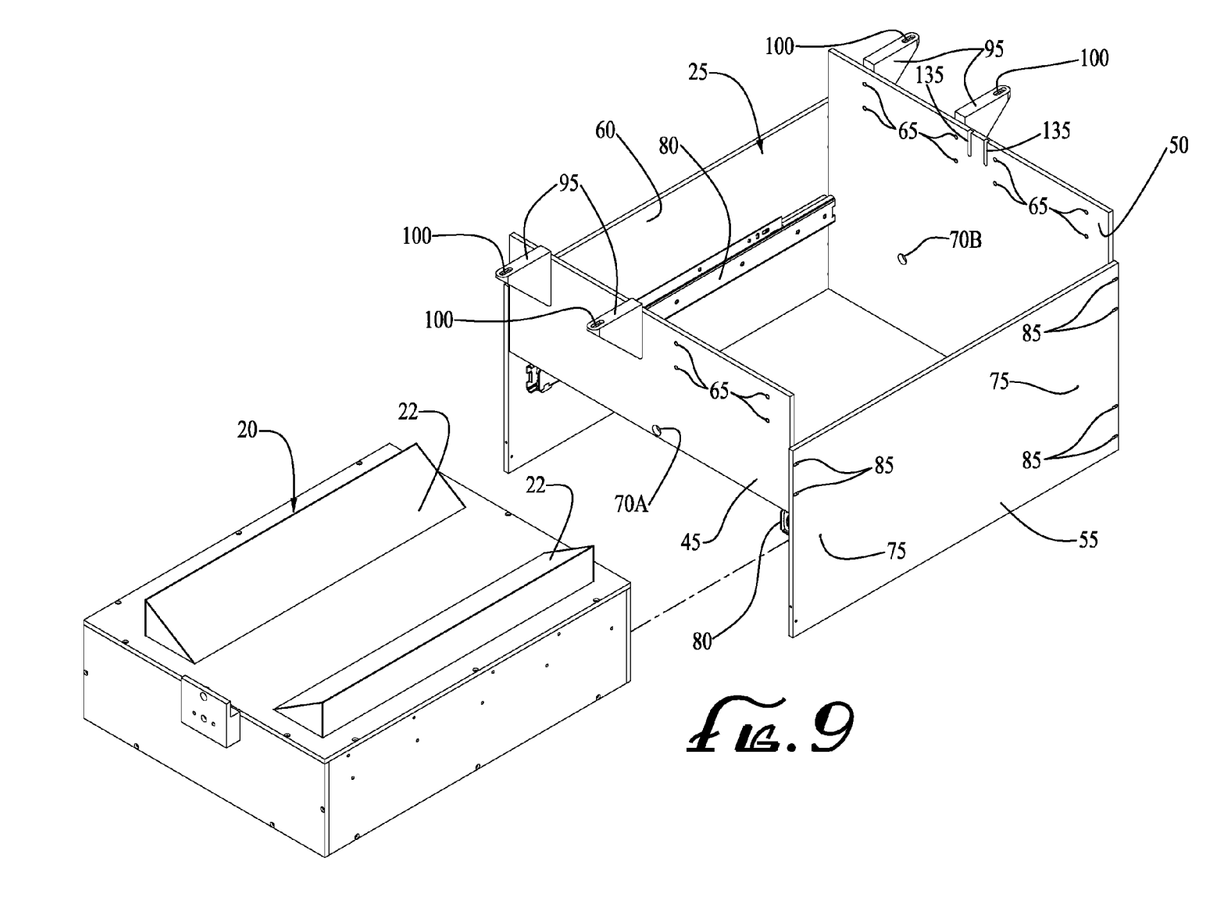
FIG. 9 is an enlarged front top, exploded isometric view of the bottom data reader mount according to another embodiment.

FIG. 9 illustrates another embodiment of the bottom data reader mount 20 illustrating windows 22 arranged in a second embodiment. With reference to FIG. 9, the tunnel data reader arrangement 5 may include the same or similar components as previously described with reference to the embodiment illustrated in FIGS. 1 and 3-5. In some embodiments, the windows 22 may protrude outwardly from the bottom data reader mount 20 and have a downwardly angled surface toward the middle of the bottom data reader mount 20 to prevent liquids or other debris that may fall through the conveyors 31, 32 from accumulating on the windows 22 and to direct the liquids and other debris away from the field of the view of the data reader(s) contained in the bottom data reader mount 20. Thus, the angled windows 22 may allow for longer periods between cleaning/servicing of the bottom data reader mount 20 and the windows 22.

In some embodiments, the bottom data reader mount 20 may include grooves or channels disposed adjacent to or near the angled end of the windows 22 to catch the liquid or debris running off the windows 22. The grooves or channels may help contain the liquid or debris and help prevent the liquid or debris from spreading onto other components of the tunnel data reader arrangement 5 or onto the floor prior to servicing or cleaning the bottom data reader mount 20.

In some embodiments, the windows 22 may be integrally formed as one piece of the bottom data reader mount 20. In other embodiments, the windows 22 may be formed as separate components and thereafter adhered to or otherwise rigidly coupled or mounted to the bottom data reader mount 20. In yet other embodiments, the windows 22 may be formed as separate components and mounted onto the chassis 25. In such embodiments, when the bottom data reader 20 slides into position within the chassis 25, the windows 22 are positioned over the data reader(s) to help prevent pooling of liquid and debris.

Components for, and assembly of, the tunnel data reader arrangement 5 are described with reference to FIGS. 1 and 3-5. The chassis 25 is constructed of four plates, a front plate 45, a rear plate 50, and two side plates 55, 60. Plates 45, 50, 55, and 60 are preferably made from a rigid material, for example, machined, die cast, or injection molded metal, such as aluminum or steel, or other suitable rigid material, such as polyamide-imide ("PAI") or other suitable plastics. In other arrangements, the chassis 25 may be integrally formed as a single component, for example, via machining, die casting, injection molding, bending, or otherwise forming a rigid sheet material. The chassis 25 is preferably symmetric with respect to orthogonal axis X-X and Y-Y that intersect at the centroid of the chassis 25, with the exception that front plate 45 is not identical to rear plate 50. In other embodiments a chassis, such as chassis 25, may be completely symmetrical with respect to an orthogonal axis X-X and Y-Y that intersect at the centroid of the chassis.

Figure 3:
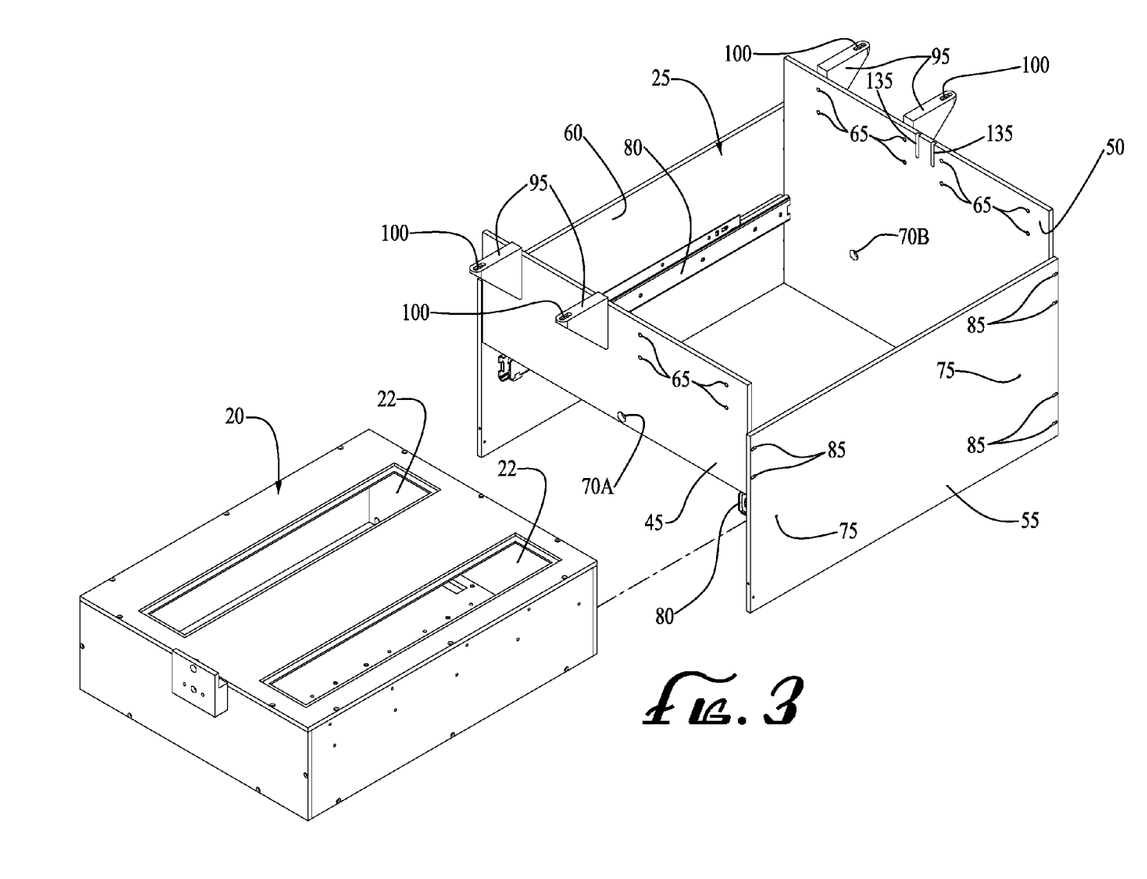
FIG. 3 is an enlarged front top, exploded isometric view of the bottom data reader mount and a chassis of the tunnel scanner of FIG. 1.

The plates 45, 50, 55, and 60 are precisely aligned and secured together, for example, with a tolerance of +/−0.005 to 0.010 inch, such that arch bracket apertures 65 in the front plate 45 are placed at a desired location with respect to arch bracket apertures 65 in the rear plate 50, and such that the arch bracket apertures 65 in both the front plate 45 and the rear plate 50 are placed at a desired location with respect to bottom data reader alignment apertures 75. In other arrangements, mounting features for mounting the bottom data reader mount 20, such as apertures 75 or slides 80, may be precisely located with respect to the arch bracket apertures 65 in both the front plate 45 and the rear plate 50. One manner for precisely aligning and securing the plates 45, 50, 55, and 60 together is via securing apertures 85 in the two side plates 55 and 60 that precisely align with threaded apertures (not illustrated) in the front plate 45 and the rear plate 50. Indexing features, such as, but not limited to, pins and mating apertures, magnets, and tongues and grooves, that are accurately positioned and toleranced, for example, +/−0.005 to 0.010 inch, may be used in conjunction with such precisely aligned apertures 85 and threaded apertures to facilitate precisely aligning the plates 45, 50, 55, and 60 and securing them together with machine screws or other suitable fasteners. Other suitable manners for aligning and attaching plates 45, 50, 55, and 60 together may be used, such as rivets, bonding materials used in conjunction with a form, or welding.

The chassis 25 serves as a reference to which the data reader structures (such as the first arch 10, the second arch 15, and the bottom data reader mount 20) are indexed. As previously discussed, each data reader is pre-positioned, tuned, or adjusted, prior to being installed in a data reader structure. By indexing the data reader structures/components to a common reference, such as chassis 25, a precise location and orientation of each data reader structure with respect to the other data reader structures is achieved without adjusting or tuning individual data reader structures or internal data reader components after assembling the tunnel data reader arrangement 5.

In a preferred assembly operation, slides or rails (not illustrated) attached to the bottom data reader mount 20 are inserted into and slidably received by corresponding slides or rails 80, such as rails commonly used for sliding drawers in desks and dressers, attached to inner surfaces of side plates 55 and 60 of the chassis 25. The bottom data reader mount 20 includes kinematic indexing features, such as pins 90A, 90B, and 90C (FIG. 1A) that are shaped, toleranced, and positioned to precisely mate with bottom data reader alignment apertures 70A, 70B, and 70C (70C is not illustrated, but is similar to 70A and 70B). It should be noted that while pins 90B and 90C are illustrated at different heights, they may be at the same height in other embodiments. When the bottom data reader mount 20 is in an operational position, each of the pins 90A, 90B, and 90C mates with a corresponding one of the bottom data reader alignment apertures 70A, 70B, and 70C to precisely align the bottom data reader mount 20 with respect to the arm bracket apertures 65 in both the front plate 45 and the rear plate 50. Preferably, slides 80 have loose tolerances, or play, in them such that slides 80 do not interfere with alignment between kinematic alignment features, such as pins 90A, 90B, and 90C and corresponding bottom data reader alignment apertures 70A, 70B, and 70C. If slides 80 are tightly toleranced, then it is preferable that slides 80 are precisely aligned and mounted to chassis 25 to facilitate alignment between pins 90A, 90B, and 90C and corresponding bottom data reader alignment apertures 70A, 70B, and 70C. The bottom data reader mount 20 may be moveably attached to the chassis 25 in other suitable manners, for example, pivotally via a hinge or pin, or may be completely detachable.

One advantage to moveably attaching the bottom data reader mount 20 to the chassis 25 is to facilitate cleaning the bottom data reader mount 20, especially windows 22, which may collect loose debris or spilled liquids. Another advantage is facilitating easy replacement of the bottom data reader mount 20 in the event one or more of the data readers contained therein break, malfunction, or need to be upgraded. Including a kinematic alignment feature, such as pins 90A, 90B, and 90C and corresponding bottom data reader alignment apertures 70A, 70B, and 70C, also facilitates replacing the bottom data reader mount 20. Maintaining sufficient manufacturing tolerances, such as +/−0.005 to 0.010 inch and +/−0.10 degree rotation, permits one data reader mount 20 to be removed from the chassis 25 and a replacement bottom data reader mount 20 to be connected to the chassis 25 without needing to adjust or tune the data reader components contained in the replacement bottom data reader mount 20 after it is attached to the chassis 25. Maintaining sufficient manufacturing tolerances also permits replacing the first arch 10 or the second arch 15 without needing to adjust or tune the data reader components contained in the replacement arch 10 or 15 after the arch is attached to the chassis 25.

In other examples, the bottom data reader mount 20, or other suitable data reader structure, is non-moveably attached to the chassis 25. For example, indexing features, such as those described above, may be used to precisely locate and orient the bottom data reader mount 20 with respect to the chassis 25.

In the embodiment illustrated in FIGS. 1 and 3-5, the first arch 10 and the second arch 15 are generally identical in shape, structure, construction, and dimensions, though there may be some differences in the internal optical components housed within the first and second arches 10, 15. In other arrangements, arches, or other suitable data reader structures need not be identical in shape, structure, or function. In yet other arrangements, only one data reader structure may project from a chassis, such as chassis 25, above one or more conveyor belts, such as conveyor belts 31 and 32 (FIG. 2).

Arch bracket apertures 65 in the front plate 45 and in the rear plate 50 are used to index arch brackets 95 to the chassis 25. Preferably, arch brackets 95 include threaded apertures that match to each arch bracket aperture 65 and a machine screw passes through each arch bracket aperture 65 and threads into the threaded apertures in the arch brackets 95 to index and secure the arch brackets 95 to the chassis 25. Additional index features, such as those described above, may also be included on the chassis 25 and the arch brackets 95 to further ensure proper indexing of the arch brackets 95 to the chassis 25.

The arch brackets 95 in turn include a second set of apertures 100 that match to or align with threaded apertures 105 in a bottom portion of the first arch 10 to index the first arch 10 to the chassis 25. Machine screws (not illustrated) pass through apertures 100 and thread into the second set of threaded apertures 105 on the first arch 10 to index and secure the first arch 10 to the chassis. In other arrangements, the arch brackets 95 may be formed integrally as part of a chassis, or a chassis may include other suitable structure to which an arch or other suitable data reader structure attaches. Additional indexing features, such as those described above, may also be included on the arch brackets 95 and the first arch 10 to further ensure proper indexing of the first arch 10 to the chassis 25.

In addition to indexing features, the arch brackets 95 may also include keying features. The indexing features serve to properly orient objects, such as the arch brackets 95 and the arches 10 and 15, with respect to the chassis 25. The keying features serve to ensure that the proper object is located in the proper location and orientation with respect to the chassis 25. One difference between indexing features and keying features is that indexing features may be identical to each other, that is, an indexing feature on the first arch 10 may match with an indexing feature of an arch bracket 95 intended to mate with an indexing feature on the second arch 15. In contrast, keying features are typically unique such that a keying feature on the first arch 10 does not match a keying feature of an arch bracket 95 intended to mate with a keying feature of the second arch 15. Thus, keying features may also serve as indexing features, but indexing features may not necessarily serve as keying features. Keying features may be included on the chassis 25 and on the arch brackets 95 to ensure that each arch bracket 95 is matched to a corresponding set of arch bracket apertures 65. Additional keying features may be included on the arch brackets 95 and the first and second arches 10, 15 to ensure each arch 10,15 is in its proper location, is not offset by 180 degrees, or both.

Additional modularity for the tunnel data reader arrangement 5 may be achieved by including indexing features, keying features, or both on data reader boxes 110 and upright supports 115A and 115B. Thus, data reader boxes 110 may be shipped as separate components for later assembly at a system integrator location or at a user location, such as a retail store. Decorative cover pieces 120A and 120B may also be included. Decorative cover pieces 120A and 120B are preferably molded plastic and snap in place, or are attached via rivets, screws, or other suitable fasteners, onto the tunnel data reader arrangement 5.

One advantage associated with the embodiment illustrated in FIGS. 1 and 3-5 may be that the chassis 25 may also serve to orient and retain two conveyor belts. Such retention preferably locates free ends of conveyor belts 31 and 32 (FIG. 2) with a gap 33 therebetween such that the data readers in the bottom data reader mount 20 have a proper field of view between the conveyor belts 31 and 32 for capturing a bottom view of the object as it crosses the gap 33. For example, 4 pins 125 (two of which are illustrated in FIG. 1) located in rollers 130 at the free ends of the conveyor belts 31 and 32 slide into 4 slots 135 (two of which are illustrated in FIG. 1) located in the chassis 25. Other suitable arrangements or structures may be used to provide an adequate gap between conveyors 31 and 32 and to locate conveyors 31 and 32 with respect to the chassis 25.

In some embodiments, the gap 33 may be positioned between the first arch 10 and the second arch 15, such as in a substantially central location. In other embodiments, the gap 33 between conveyors belts 31 and 32 may be positioned upstream in relation to the first arch 10 (i.e., the object first crosses the gap 33 and thereafter passes between the first and second arches 10, 15) or downstream in relation to the second arch 15 (i.e., the object first passes between the first and second arches 10, 15 and thereafter crosses the gap 33).

Another advantage associated with the embodiment illustrated in FIGS. 1 and 3-5 is that the chassis 25 supports both data reader structures and the conveyor belts 31, 32. In other words, the tunnel data reader arrangement 5 extends both above and below conveyor belts 31, 32 and thus provides physical support for both data readers and conveyor belts with one relatively narrow structure. Such a design eliminates the need for additional, laterally mounted support structures for the conveyor belts 31, 32.

In another embodiment, a tunnel data reader arrangement, such as tunnel data reader arrangement 5, may include one or more targets, such as a one or two dimensional optical code, adhered to, printed, or engraved on a portion of the structure, such as a chassis 25 or a data reader structure. A purpose of such target(s) is to provide a checkpoint for individual data readers. For example, after a data reader arrangement has been assembled by engaging indexing features, keying features, or both and securing data reader structures to a chassis, power may thereafter be supplied to each data reader. A data reader may view or capture one or more of such targets and by locating, reading, or decoding, individually or in any combination, such targets, the data reader may verify that it is in a proper location with respect to the chassis, a specific data reader structure, or both. Thus, when power is supplied to the data readers of a tunnel data reader arrangement, such as tunnel data reader arrangement 5, one or more data readers may verify whether the tunnel data reader arrangement was properly assembled.

Figure 4:
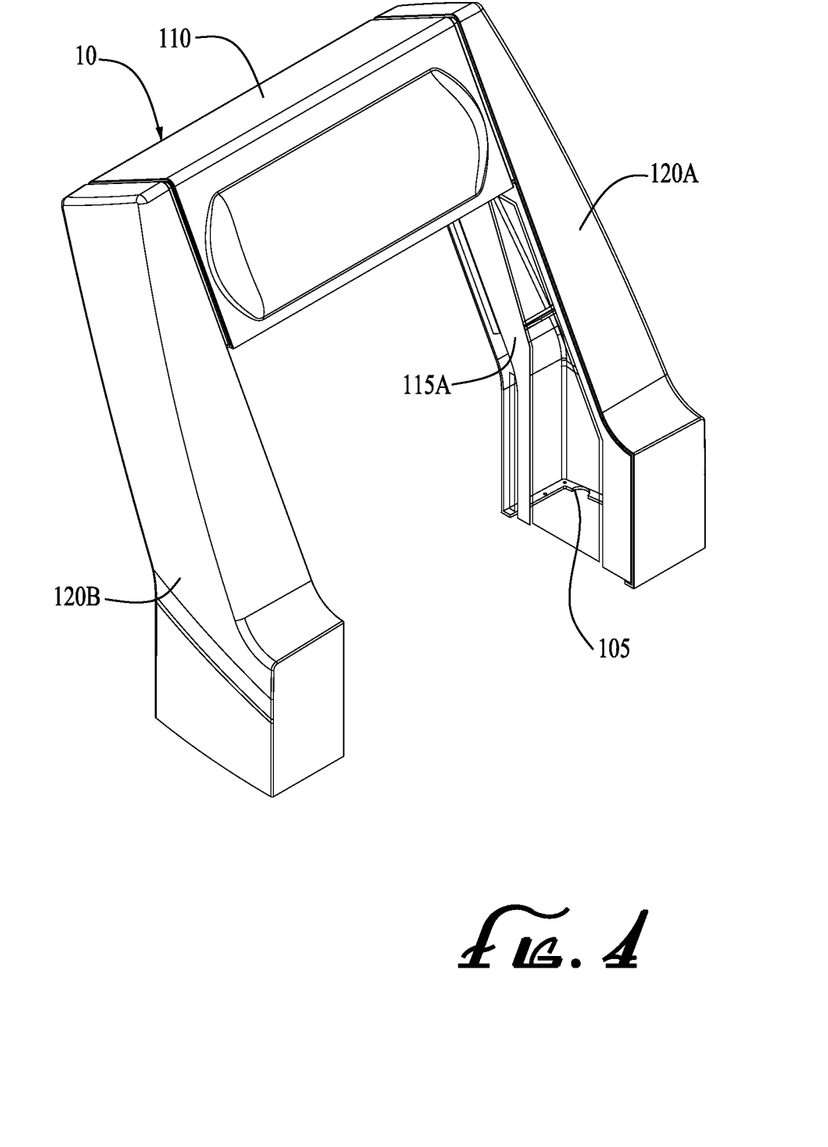
FIG. 4 is an enlarged front top, isometric view of a trailing arch of the tunnel scanner of FIG. 1.
Figure 5:
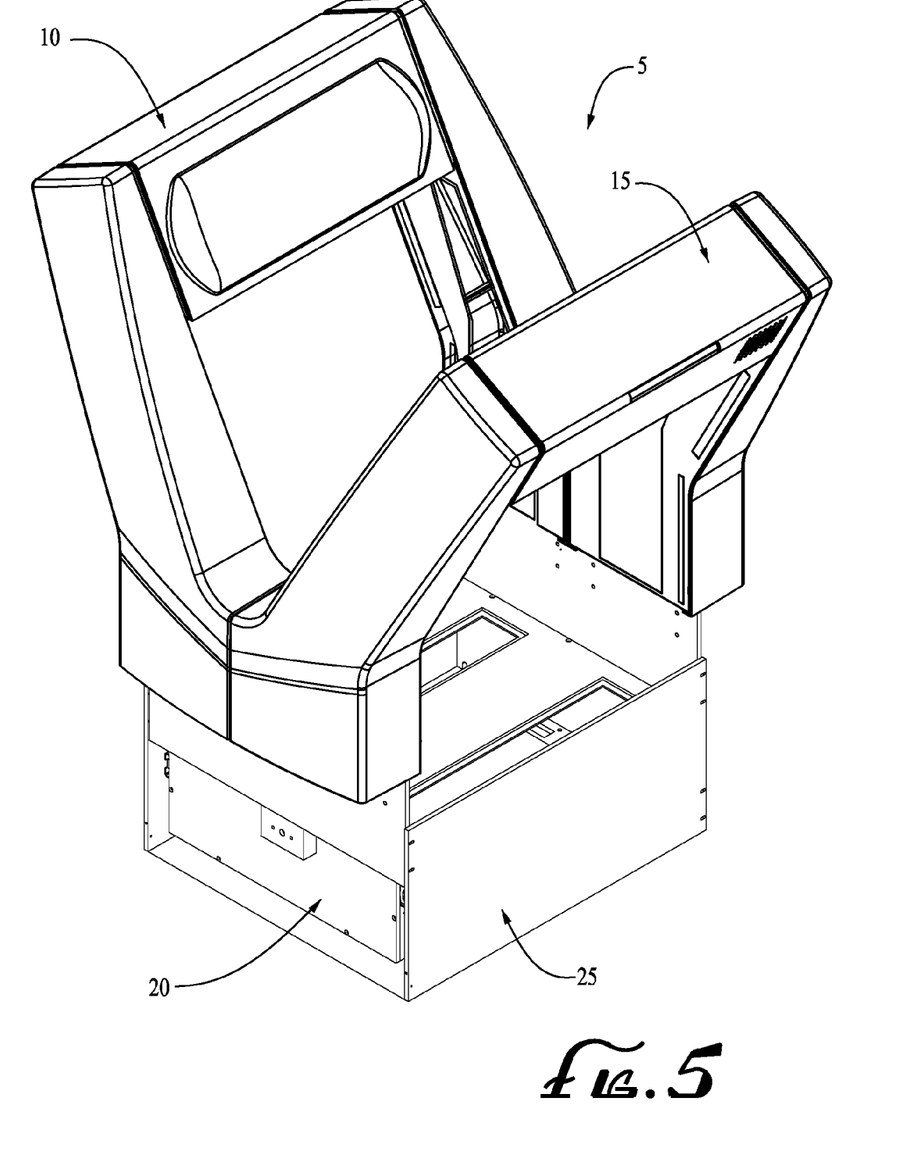
FIG. 5 is a front top, isometric view of the tunnel scanner of FIG. 1.

In another embodiment, a tunnel data reader arrangement, such as tunnel data reader arrangement 5, may include an object height detector. For example, light beam generators, such as a laser diode or other suitable light sources, and corresponding light receptors, such as a photodiode, may be included in opposing portions of the first arch 10, second arch 15, or both. The light beam generators may be secured in cavities 116 and 117 of upright support 115A (FIG. 4). Photodiodes or other suitable light detectors may be secured in corresponding cavities in upright support 115B. A "light curtain" or light gate is thus formed and whenever an object passes through the first arch 10, the object interrupts one or more of the light beams. By sensing which light beams are interrupted, the tunnel data reader arrangement can determine a height, or approximate height, for the object. A second "light curtain" or light gate may be included in the second arch 15 as well. The precise location and orientation of each data reader resulting from assembling a tunnel data reader arrangement using indexing features, keying features, or both combined with determining a trajectory for each data reader field of view and the height of objects can thus be used to track individual objects as they pass through the tunnel data reader arrangement.

In another embodiment, a tunnel data reader arrangement, such as tunnel data reader arrangement 5, may include wiring, wiring harnesses, electrical connectors, or other suitable structure for supplying electrical power to individual data readers and for sending/receiving data and communication signals from one data reader to another, or between the data readers and other systems (e.g., point-of-sale terminals, computers, hand-held devices, printers, or other peripheral devices). The wiring or other connectors may be arranged in a variety of configurations on the chassis so as to reduce the amount of connectors or length of wiring needed. Preferably, when individual data reader structures are assembled to a chassis to form the tunnel data reader arrangement, electrical sockets and plugs are engaged to connect wiring between the data reader structures and the chassis. Thus, a single electrical connector of the chassis may be connected to an electrical power source to supply electrical power to each data reader.

In another embodiment, a tunnel data reader arrangement, such as tunnel data reader arrangement 5, may include a brush, such as a nylon bristled brush, located on the chassis 25 above the bottom data reader mount 20. When the bottom data reader mount 20 is slid to the cleaning position the brush preferably sweeps the top surface of the bottom data reader mount 20 to remove particles that may have collected there.

Other embodiments are possible. Although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A method for assembling a tunnel data reader arrangement comprising:
    receiving a first and second data reader structure at an assembly location where a tunnel data reader arrangement is to be assembled, wherein the first data reader structure includes a first data reader and the second data reader structure includes a second data reader;
    providing a counter structure at the assembly location;
    providing a chassis at the assembly location;
    forming a tunnel data reader arrangement at the assembly location by;
        matching a first indexing feature of the first data reader structure with a corresponding first indexing feature of the chassis;
        attaching the first data reader structure to the chassis such that the first data reader structure extends upwardly relative to an uppermost, top surface of the chassis, wherein the first data reader is arranged in a first position at a first angular orientation with respect to the chassis;
        matching a second indexing feature of the second data reader structure with a corresponding second indexing feature of the chassis; and
        attaching the second data reader structure to the chassis such that the second data reader is arranged in a second position at a second angular orientation with respect to the chassis; and
    coupling the tunnel data reader arrangement to the counter structure.

2. A method for assembling a tunnel data reader arrangement according to claim 1, wherein the counter structure further includes a conveying element, and wherein coupling the tunnel data reader arrangement to the counter structure further comprises inserting the tunnel data reader arrangement into the counter structure such that at least a portion of the chassis is positioned beneath and supports the conveying element of the counter structure and at least a portion of the chassis is enclosed within the counter structure, wherein alignment and orientation of the first and second data readers are independent of the configuration and tolerances of the counter structure.

3. A method for assembling a tunnel data reader arrangement according to claim 1, wherein:
    attaching the first data reader structure includes mating a keying feature of the first data reader structure to a corresponding first keying feature of the chassis; and
    attaching the second data reader structure includes mating a keying feature of the second data reader structure to a corresponding second keying feature of the chassis.

4. A method for assembling a tunnel data reader arrangement according to claim 1, further comprising:
providing a target on at least one of: the chassis, the first data reader structure, or the second data reader structure;
providing electrical power to a data reader; and
via the data reader, viewing the target to determine whether the tunnel data reader arrangement is properly arranged.

5. A method for assembling a tunnel data reader arrangement according to claim 1, wherein the first data reader of the first data reader structure is spaced apart from and positioned above the chassis when the first data reader structure is attached to the chassis.

6. A mounting structure system for a data reader arrangement comprising:
a counter structure;
a chassis coupled to the counter structure;
a first data reader structure indexed and attached to the chassis, the first data reader structure extending upwardly relative to an uppermost top surface of the chassis, the first data reader structure including a first data reader disposed at a first position at a first angular orientation with respect to the chassis, wherein the first data reader is arranged to view a top and a first lateral side of an object;
a second data reader structure indexed and attached to the chassis, the second data reader structure extending upwardly relative to the uppermost top surface of the chassis, the second data reader structure including a second data reader disposed at a second position at a second angular orientation with respect to the chassis, wherein the second data reader is arranged to view the top and a second lateral side of the object; and
a third data reader structure indexed and attached to the chassis, the third data reader structure positioned beneath the first data reader structure and beneath the second data reader structure, the third data reader structure including a third data reader arranged to view a bottom of the object opposite the top of the object.

7. A mounting structure system according to claim 6, wherein:
the third data reader structure is moveably coupled to the chassis such that the third data reader is moveable between an operating position, whereat the data reader is housed within the chassis, and a maintenance position, whereat at least a portion of the data reader extends outside the chassis, while coupled to the chassis.

8. A mounting structure system according to claim 6, wherein the third data reader structure includes angled windows protruding from a surface of the third data reader structure, the angled windows arranged and positioned to direct liquid and debris away from the second data reader.

9. A mounting structure system according to claim 6, wherein the first data reader of the first data reader structure is spaced apart from and positioned above the chassis.

10. A mounting structure system according to claim 6, wherein at least a portion of the chassis is positioned beneath and supports a conveying element and at least a portion of the chassis is enclosed within the housing structure when coupled thereto.

11. A method for assembling a tunnel data reader arrangement comprising:
receiving a first and second data reader structure at an assembly location where a tunnel data reader arrangement is to be assembled, wherein the first data reader structure includes a first data reader and the second data reader structure includes a second data reader;
providing a housing structure at the assembly location;
providing a chassis at the assembly location;
forming a tunnel data reader arrangement at the assembly location by;
matching a first indexing feature of the first data reader structure with a corresponding first indexing feature of the chassis;
attaching the first data reader structure to the chassis such that the first data reader is arranged in a first position at a first angular orientation with respect to the chassis;
matching a second indexing feature of the second data reader structure with a corresponding second indexing feature of the chassis; and
attaching the second data reader structure to the chassis such that the second data reader is arranged in a second position at a second angular orientation with respect to the chassis;
coupling a conveying element to the chassis of the tunnel data reader arrangement, wherein the conveying element is supported by the chassis; and
coupling the tunnel data reader arrangement to the housing structure.

12. A method for assembling a tunnel data reader arrangement according to claim 11, wherein the first data reader structure extends upwardly from the chassis when attached thereto, and wherein the first data reader of the first data reader structure is spaced apart from and positioned above the chassis.

13. A method for assembling a tunnel data reader arrangement according to claim 11, wherein coupling the tunnel data reader arrangement to the housing structure further comprises inserting the tunnel data reader arrangement into the housing structure such that at least a portion of the chassis is positioned beneath the conveying element and at least a portion of the chassis is enclosed within the housing structure.

14. A mounting structure system for a data reader arrangement comprising:
a housing structure;
a chassis coupled to the housing structure;
a first data reader structure indexed and attached to the chassis;
a first data reader indexed and attached to the first data reader structure such that the first data reader is disposed at a first position at a first angular orientation with respect to the chassis;
a second data reader structure indexed and attached to the chassis;
a second data reader indexed and attached to the second data reader structure such that the second data reader is disposed at a second position at a second angular orientation with respect to the chassis;
a conveyor coupled to and supported by the chassis, the conveyor having a first conveying element and a second conveying element spaced apart by a gap therebetween; and
a third data reader supported by the chassis and positioned beneath the conveyor, the third data reader having a field of view oriented through the gap for capturing a bottom view of the object.

15. A mounting structure system according to claim 14, wherein the first data reader structure extends upwardly from the chassis, and wherein the first data reader of the first data reader structure is spaced apart from and positioned above the chassis.

16. A mounting structure system according to claim 14, wherein at least a portion of the chassis is positioned beneath and supports the conveyor and at least a portion of the chassis is enclosed within the housing structure when coupled thereto.

* * * * *

UNITED STATES PATENT AND TRADEMARK OFFICE
CERTIFICATE OF CORRECTION

| | | |
|---|---|---|
| PATENT NO. | : 8,857,712 B2 | Page 1 of 1 |
| APPLICATION NO. | : 13/454377 | |
| DATED | : October 14, 2014 | |
| INVENTOR(S) | : Jeffrey J. Hoskinson et al. | |

It is certified that error appears in the above-identified patent and that said Letters Patent is hereby corrected as shown below:

In the Specification,

In column 8, line 33, please replace "1208" with --120B--.

In column 8, line 34, please replace "1208" with --120B--.

Signed and Sealed this
Twenty-seventh Day of January, 2015

Michelle K. Lee
*Deputy Director of the United States Patent and Trademark Office*